US009940623B2

(12) United States Patent
Lawless (10) Patent No.: US 9,940,623 B2
(45) Date of Patent: *Apr. 10, 2018

(54) METHOD AND SYSTEM FOR FACILITATING PAYMENTS ON A PAYMENT CARD NETWORK

(71) Applicant: MASTERCARD INTERNATIONAL INCORPORATED, Purchase, NY (US)

(72) Inventor: Paul Lawless, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/340,788

(22) Filed: Nov. 1, 2016

(65) Prior Publication Data

US 2017/0046703 A1  Feb. 16, 2017

Related U.S. Application Data

(63) Continuation of application No. 14/660,424, filed on Mar. 17, 2015, now Pat. No. 9,514,460.

(30) Foreign Application Priority Data

Mar. 18, 2014 (GB) .................................. 1404810.2

(51) Int. Cl.
*G06K 19/00* (2006.01)
*G06Q 20/40* (2012.01)
*G06Q 20/32* (2012.01)

(52) U.S. Cl.
CPC ....... *G06Q 20/405* (2013.01); *G06Q 20/3278* (2013.01); *G06Q 20/401* (2013.01)

(58) Field of Classification Search
CPC .......... G07F 7/1008; G07F 7/12; G07F 7/122; G06Q 20/341
USPC ................................ 235/487, 492, 380, 383
See application file for complete search history.

(56) References Cited

U.S. PATENT DOCUMENTS

| 2006/0255126 | A1* | 11/2006 | Hein ...................... | G06K 19/08 235/380 |
| 2014/0244409 | A1* | 8/2014 | Nathanel ................ | G06Q 50/12 705/15 |
| 2015/0058220 | A1* | 2/2015 | Cazanas ................. | G06Q 20/40 705/44 |

* cited by examiner

*Primary Examiner* — Daniel St Cyr
(74) *Attorney, Agent, or Firm* — Harness, Dickey & Pierce, P.L.C.

(57) ABSTRACT

A computer implemented method of processing a payment request is provided, the method comprising operating a processor of a network node to: (i) determine that a current time is within a predefined period of a payment time associated with a payment profile; (ii) determine an account number, a payment amount and a payment provider associated with the payment profile; (iii) transmit to the payment provider a request for pre-authorization of payment of the payment amount from an account associated with the determined account number; and (iv) responsive to receiving a pre-authorization from the payment provider, associating an authorization indication with the payment profile.

20 Claims, 7 Drawing Sheets

METHOD AND SYSTEM FOR FACILITATING PAYMENTS ON A PAYMENT CARD NETWORK

CROSS-REFERENCE TO RELATED APPLICATIONS

This application is a continuation application of U.S. patent application Ser. No. 14/660,424, filed Mar. 17, 2015, which claims the benefit of and priority to Great Britain Application No. 1404810.2, filed Mar. 18, 2014. The entire disclosures of the above applications are incorporated herein by reference.

FIELD

The present disclosure relates to payment card systems. More particularly, it relates to methods and systems for processing transactions conducted via a point of sale terminal in a payment card network.

BACKGROUND

This section provides background information related to the present disclosure which is not necessarily prior art.

In a typical transaction using a credit or debit card, a card holder wishing to complete a transaction (or make a payment) provides a Primary Account Number (PAN) (or card number) together with other card details (such as a card expiry date, card code verification (CCV) number etc.) to a merchant at a point of sale terminal. The merchant transmits the card number and the details to an 'acquirer', i.e. a financial institution that facilitates and processes card payments made to the merchant.

The acquirer then transmits an authorization request via a payment card network to an issuer or payment provider of the card used to make the payment.

The payment provider processes the received request and determines whether or not the request is allowable. If the issuer determines that the payment request is allowable, an authorization response is transmitted via the payment card network to the acquirer and initiates the transfer of the payment amount to the merchant's account. Responsive to receiving the authorization response from the issuer, the acquirer communicates the authorization response to the point of sale terminal. In this manner, a card number may be used to effect a card payment to a merchant.

However, there are many situations in which the processing associated with effecting the payment results in unacceptable delays for a user and/or merchant wishing to effect a payment.

SUMMARY

This section provides a general summary of the disclosure, and is not a comprehensive disclosure of its full scope or all of its features.

In accordance with an aspect of the disclosure, there is provided a computer implemented method of processing a payment request, the method comprising operating a processor of a network node to: (i) determine that a current time is within a predefined period of a payment time associated with a payment profile; (ii) determine an account number, a payment amount and a payment provider associated with the payment profile; (iii) transmit to the payment provider a request for pre-authorization of payment of the payment amount from an account associated with the determined account number; and (iv) responsive to receiving a pre-authorization from the payment provider, associating an authorization indication with the payment profile.

The method may further comprise operating the processor of the network node to: receive a payment request, the request comprising data indicative of an account number and at least one payment parameter; identify a payment profile associated with the account number; determine, in accordance with the at least one payment parameter, that the payment request matches the identified payment profile; and responsive to determining that the payment profile is associated with an authorization indication, operating the processor to output an authorization of the payment request. In this manner, payment requests matching a stored payment profile can be authorized quickly and efficiently.

The at least one payment parameter may comprise data indicative of one or more of: a recipient; a payment amount; and a time at which the payment request is received. Subsequent to outputting the authorization of the payment request, the processor may be operated to: transmit to the payment provider a request for payment of the payment amount to the recipient from an account associated with the account number.

The received authorization indication may have an associated time period. In some embodiments, responsive to determining that an elapsed time since receiving the pre-authorization is greater than the time period associated with the authorization indication, the processor is operated to repeat steps (iii) and (iv) at predefined intervals until a limiting condition is detected.

The limiting condition may comprise one or more of the following: receiving a payment request comprising data indicative of the account number; determining that steps (iii) and (iv) have been performed a predetermined number of times; and determining that a current time is not within a predefined period of the payment time.

Prior to performance of steps (i) to (iv) the processor may be operated to: receive an initial payment request comprising data indicative of an account number, a payment provider and a payment amount; and responsive to determining that the account number is not associated with a payment profile, operating the processor to: create a payment profile associated with the account number; and store the created payment profile in association with an indication of the payment provider, an indication of the payment amount, and an indication of a time of receiving the initial payment request.

Responsive to determining that the account number is associated with a payment profile, the method may comprise operating the processor to: update the payment profile in accordance with the payment provider, the payment amount and a time of receiving the initial payment request.

In accordance with a further aspect of the disclosure, there is provided a computer-implemented method of processing a request at a network node operated in association with a payment provider, the method comprising operating a processor to: receive a first request from a terminal, the first request comprising data indicative of an account number; determine a location associated with the terminal; identify at least one further terminal associated with the determined location, wherein the at least one further terminal is configured to process payment requests in accordance with a first set of authorization rules; and transmit an authorization message to the at least one further terminal, wherein the authorization message is indicative that the terminal should process payment requests associated with the account number in accordance with a second set of authorization rules. The first request may comprise a payment request.

In some embodiments, the first set of authorization rules comprises data indicative of a first maximum payment amount that can be authorized using radio frequency identification (RFID) and the second set of authorization rules comprises data indicative of a second maximum payment amount that can be authorized using radio frequency identification, the second maximum payment amount being greater than the first maximum payment amount.

The first set of authorization rules may comprise data indicative that payment requests associated with the account number and requesting payment of an amount less than a maximum payment amount can be authorized by the at least one further terminal.

After expiry of a predefined period, the at least one further terminal may process payment requests associated with the account number in accordance with the first set of authorization rules.

In accordance with a further aspect of the disclosure, there is provided a non-transitory computer-readable medium comprising instructions which, when executed, cause a processor to perform any of the above-described methods.

In accordance with a further aspect of the disclosure, there is provided a network node configured to operate on a payment network, the network node comprising a processor configured to: (i) determine that a current time is within a predefined period of a payment time associated with a payment profile; (ii) determine an account number, a payment amount and a payment provider associated with the payment profile; (iii) transmit to the payment provider a request for pre-authorization of payment of the payment amount from an account associated with the determined account number; and (iv) responsive to receiving a pre-authorization from the payment provider, associating an authorization indication with the payment profile.

The processor may be further configured to: receive a payment request, the request comprising data indicative of an account number and at least one payment parameter; identify a payment profile associated with the account number; determine, in accordance with the at least one payment parameter, that the payment request matches the identified payment profile; and responsive to determining that the payment profile is associated with an authorization indication, which may have an associated time period, to output an authorization of the payment request.

The at least one payment parameter may comprise data indicative of one or more of: a recipient; a payment amount; and a time at which the payment request is received.

The network node may be configured such that, subsequent to outputting the authorization of the payment request, the processor is operated to: transmit to the payment provider a request for payment of the payment amount to the recipient from an account associated with the account number.

The network node may additionally or alternatively be configured such that, responsive to determining that an elapsed time since receiving the pre-authorization is greater than the time period associated with the authorization indication, the processor is operated to repeat steps (iii) and (iv) at predefined intervals until a limiting condition is detected.

The limiting condition may comprise one or more of the following: receiving a payment request comprising data indicative of the account number; determining that steps (iii) and (iv) have been performed a predetermined number of times; and determining that a current time is not within a predefined period of the payment time.

The network node may be configured such that, prior to performance of steps (i) to (iv), the processor is operated to: receive an initial payment request comprising data indicative of an account number, a payment provider and a payment amount; and responsive to determining that the account number is not associated with a payment profile, operating the processor to: create a payment profile associated with the account number; and store the created payment profile in association with an indication of the payment provider, an indication of the payment amount, and an indication of a time of receiving the initial payment request.

The network node may be configured such that, responsive to determining that the account number is associated with a payment profile, the processor is operated to: update the payment profile in accordance with the payment provider, the payment amount and a time of receiving the initial payment request.

In accordance with a further aspect of the disclosure, there is provided a system comprising: any of the above-described network nodes; and at least one terminal, wherein the payment request is received from the at least one terminal.

In accordance with a further aspect of the disclosure, there is provided a network node configured to operate on a payment network, the network node comprising a processor configured to: receive a first request, which may comprise a payment request, from a first terminal, the first request comprising data indicative of an account number; determine a location associated with the terminal; identify at least one further terminal associated with the determined location, wherein the at least one further terminal is configured to process payment requests in accordance with a first set of authorization rules; and transmit an authorization message to the at least one further terminal, wherein the authorization message is indicative that the terminal should process payment requests associated with the account number in accordance with a second set of authorization rules.

In some embodiments, the first set of authorization rules comprises data indicative of a first maximum payment amount that can be authorized using radio frequency identification (RFID) and the second set of authorization rules comprises data indicative of a second maximum payment amount that can be authorized using radio frequency identification, the second maximum payment amount being greater than the first maximum payment amount.

The first set of authorization rules may comprise data indicative that payment requests associated with the account number and requesting payment of an amount less than a maximum payment amount can be authorized by the at least one further terminal. After expiry of a predefined period, the at least one further terminal may process payment requests associated with the account number in accordance with the first set of authorization rules.

In accordance with a further aspect of the disclosure, there is provided a system comprising: a network node as described above; a first terminal and at least one further terminal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Embodiments of the present disclosure will now be discussed with reference to the enclosed figures. However, a person skilled in the art will readily appreciate that the detailed description given herein with respect to these figures are for explanatory purposes only, as embodiments of the present disclosure may extend beyond these embodiments Referring to the drawings and, in particular to FIG. 1, an exemplary payment system 100 for processing payment requests is shown.

Figure 1:
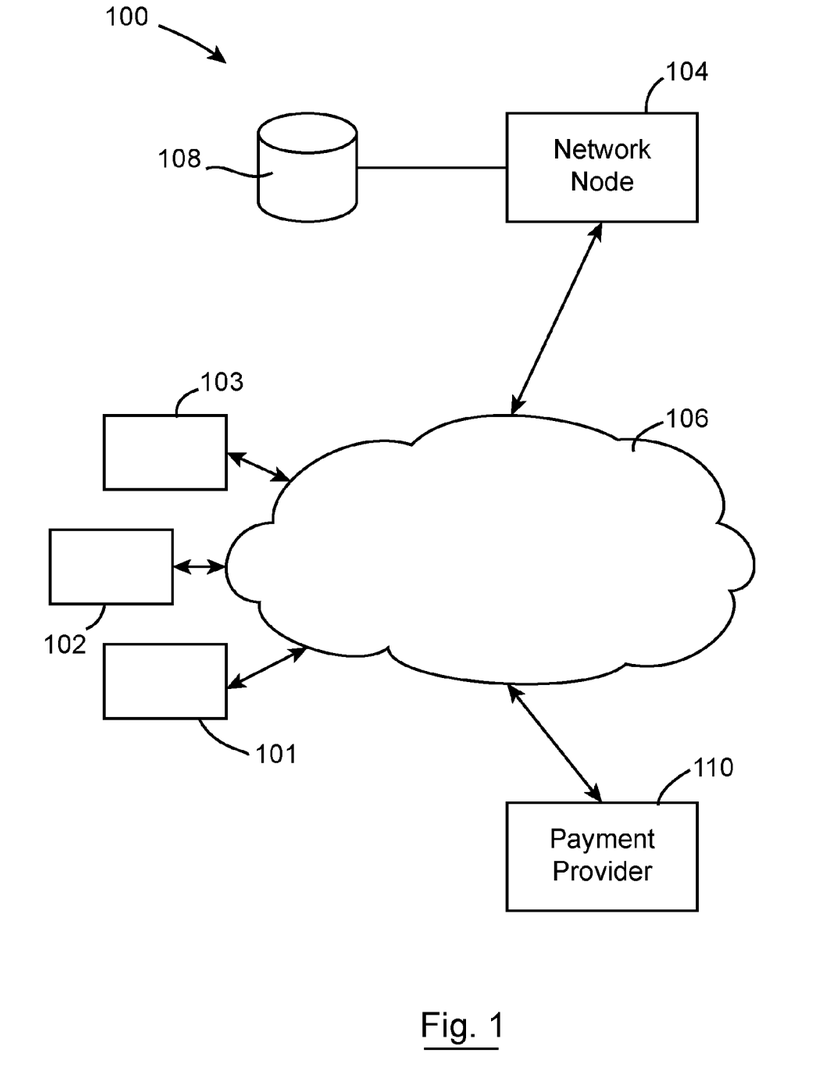
FIG. 1 is a diagram of a card payment system according to an embodiment of the disclosure.

The system 100 comprises at least one merchant terminal 101, 102, 103 capable of, or adapted to, transmit a request to a network node 104 over a network 106. It will be appreciated that the merchant terminal 101-103 itself comprises a network node and is differentiated from the network node 104 in the following for ease of explanation only. Furthermore, it will be appreciated that any steps described in the following as being performed by a merchant terminal 101-103 may equally be performed by a network node 104.

The merchant terminals 101-103 may be devices of the same type and/or devices used by the same recipient. For example, the merchant terminals 101-103 may be Point of Sale (POS) terminals operating in a given shop. Additionally or alternatively, the merchant terminals 101-103 may comprise a plurality of devices of different types.

One or more of the merchant terminals 101-103 may comprise, or be comprised within, a physical terminal. For example, one of the merchant terminals 101-103 may comprise one or more of: a portable computing device (e.g. a laptop computer, a smartphone, a tablet computer etc.); a desktop computer; a physical Point Of Sale (POS) or terminal, for example a terminal located at a physical point of sale such as a shop or restaurant.

Additionally or alternatively, one or more of the merchant terminals 101-103 may be a virtual terminal associated with a virtual Point Of Sale, e.g. a POS at which online purchases or payments can be made. In some embodiments, one or more of the merchant terminals 101-103 may be an application running on a device such as a portable telephone or computer (e.g. a 'smartphone' or tablet computer).

The network node 104 may comprise, or be comprised within, any suitable device. For example, the network node 104 may comprise, or be comprised within, a remote server. Additionally or alternatively, the network node 104 may be comprised within a base station. In what follows, the network node 104 will be referred to as a single node within the system 100. However, it will be appreciated that the network node may comprise multiple individual nodes at which the request is processed and/or re-transmitted. Similarly, as discussed above, the network node 104 may comprise or be comprised within a merchant terminal 101-103.

It will be appreciated that steps that are described as being performed by the network node 104 may equally be performed by other elements of the system 100 e.g. one of the merchant terminals 101-103, or by one or more processors comprised within, or operated by, the network node 104 and/or other elements of the system 100. The network node 104 may be configured to communicate with one or more respective databases 108, for example, via a wired or wireless connection. For example, the network node 104 may write data to the one or more databases 108. Additionally or alternatively, the network node 104 may retrieve data stored in, or accessible to, the database 108.

The network node 104 may be an 'acquirer network node' for example a POS or other such device associated with (linked to, operated on behalf of, comprised within a system of, etc.) a financial institution that processes (or facilitates) card payments made to a merchant. Additionally or alternatively, the network node 104 be one or more of a network node associated with (linked to, operated on behalf of, comprised within a system of etc.) a payment provider 110 (or card issuer); and/or a card payment network node associated with a third party operating as, or in association with, a payment provider 110.

The payment provider 110 is a network node operated by, in association with, or on behalf of a card issuer. The payment provider 110 provides an account from which the user can make payments to payment recipients. The payment provider 110 receives a payment request from a network node 104; processes the received request to ensure that the details provided meet the necessary requirements (e.g. the card number and or other security details are the expected values for use in association with the account); determines whether there are sufficient funds and/or a sufficient credit limit to make the requested payment; and, if so, effects the requested payment.

The merchant terminal 102 may communicate with the network node 104 using any suitable means. For example, the merchant terminal 102 and the network node 104 may communicate using one or more of Bluetooth™; Near-Field Communication (NFC); Infra-Red (IR) Communication; Magnetic Induction, etc.

In an exemplary embodiment, the network 106 may comprise any network across which communications can be transmitted and received. For example, the network 106 may comprise a wired or wireless network. The network 106 may, for example, comprise one or more of: the internet; a local area network; a radio network such as a mobile or cellular network; a mobile data network or any other suitable type of network, etc. In one embodiment, the merchant terminal 102 communicates over the internet with the network node 104 operating on 'a cloud'.

Figure 2A:
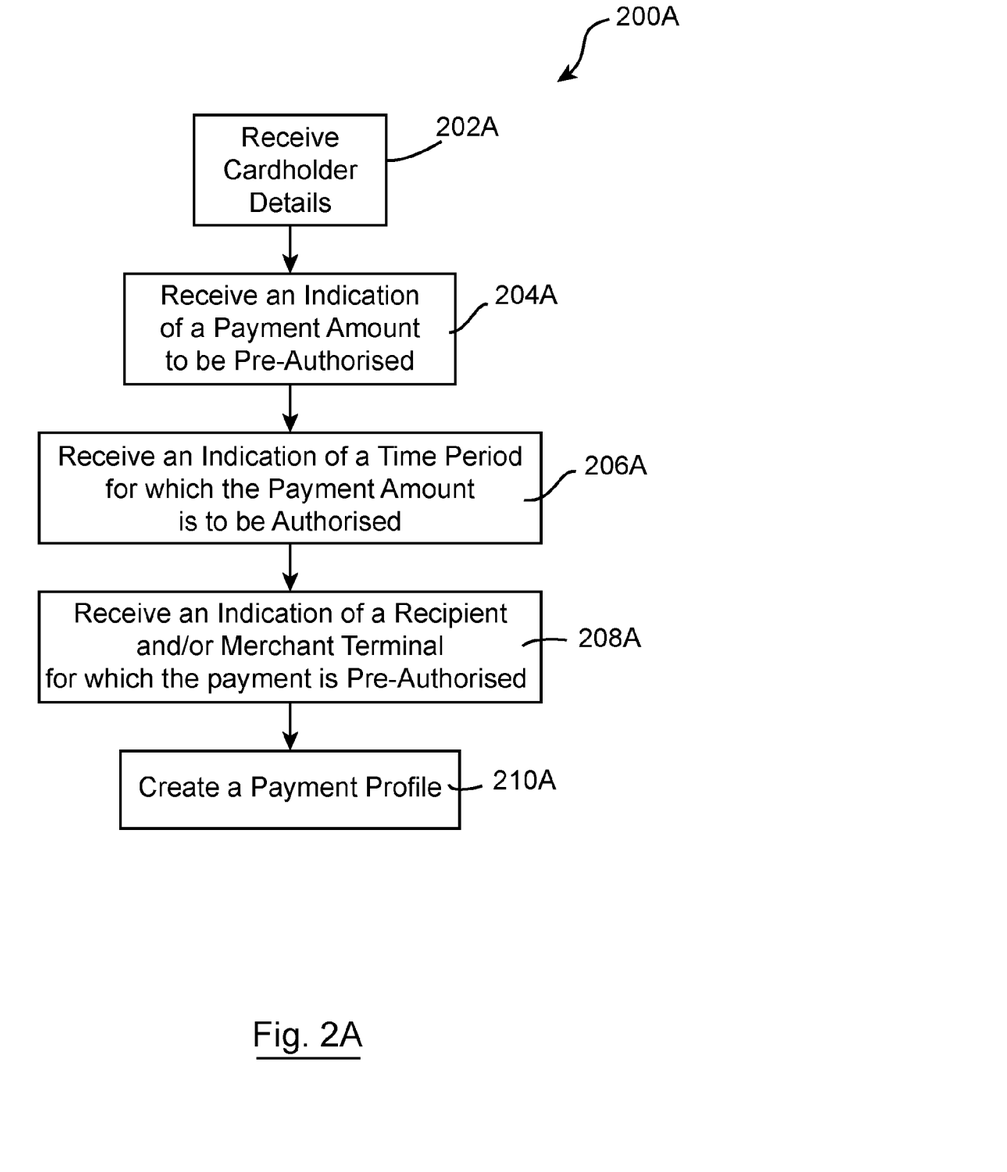
FIG. 2A is a flow diagram depicting an exemplary method of registering a cardholder to use the system according to an embodiment of the disclosure.

FIG. 2A depicts an exemplary method 200A of registering a cardholder to use the pre-authorization system 100 in accordance with an embodiment of the disclosure. In the following, the method 200A is described as being performed by the network node 104. However, as discussed above, it will be appreciated that these steps may equally be performed by the merchant terminal 102 which is also a node operating on the network 106. Additionally or alternatively, the registration process may be performed (or part-performed) by one or more other nodes in a card payment network. For example, the registration process may be performed by a card issuer, an acquirer or a third party operating in association with a payment provider 110.

At step 202A, the network node 104 receives a cardholder's details during a registration process. The details are received via a registration interface which may be provided in any suitable manner. For example, the registration interface may be provided online via a provider website (not shown), via a telephone service, in person, etc. In some embodiments, cardholders may register to use the system 100 at a point of sale, in which case, the registration interface may be provided by a merchant terminal 101-103.

The details received at step 202A comprise information required to authorize a payment from a debit or credit card registered to (owned by, associated with, etc.) the cardholder. In particular, the received details comprise a card number or other identifier associated with the cardholder's account. The card number or identifier may be referred to as a Primary Account Number (PAN). The number comprised within the received details may be a number of a physical (regular or actual) credit and/or debit card, e.g. a number printed on a cardholder's card and linked to a cardholder's account.

The number comprised within the request may additionally or alternatively be a virtual card number (a dynamic credit card number, a controlled payment number, an alias number, a one-time use credit card number, a substitute credit card number, a rechargeable credit card number, etc.). A virtual card number is generated by a card issuer and is linked to at least one physical card number and account. The virtual card number may, for example, be generated via a Web application or a specialized client program provided by, or associated with, an issuer of the physical card number to which the virtual card number is linked.

Additionally, the details received at step 202A may comprise information indicative of one or more of: the cardholder's name; the cardholder's date of birth; the cardholder's address; a payment provider 110 associated with the card; the expiry date of the card; the issue date of the card; the credit card verification (CCV) number of the card; and a response to a security question previously set by the cardholder.

At step 204A, the network node 104 receives (identifies, determines or extracts) data indicative of a payment or purchase amount that is to be pre-authorized. The purchase amount may be defined as a single payment amount that is to be pre-authorized for payment by a card associated with the PAN in accordance with the payment profile. Additionally or alternatively, the purchase amount may be defined as a range of allowable payment amounts wherein the pre-authorization is in respect of any amount within the defined range.

At step 206A, the network node (identifies, determines or extracts) information indicative of a period of time for which the payment is to be pre-authorized. The received information may, for example, be indicative of a period of time on a specified date, for example, between 7 pm and 9 pm on 19 Dec. 2013. In this manner, a cardholder who knows in advance that he is likely to be making a specific purchase at a specific time (or within a specific period of time) can register in advance so that the purchase is pre-authorized thereby avoiding unnecessary delays when completing the purchase.

In an exemplary embodiment, the specified period of time may be a specified range of times repeating at regular or irregular intervals. For example, a cardholder may register for pre-authorization of a purchase of a cup of coffee every weekday morning between 8 am and 9 am. In this manner, the cardholder can avoid delays when purchasing a daily coffee on the way to work. Similarly, a cardholder may, for example, wish to register for pre-authorization of a purchase of fuel on one or more occasions each month.

At step 208A, the network node 104 receives (identifies, determines or extracts) data indicative of a payment recipient. In this manner, the network node 104 receives data indicative of one or more of a range of times, days and/or dates during which a payment for the specified amount is to be pre-authorized to the specified payment recipient. Additionally or alternatively, at step 208A, the network node 104 may receive (identify, determine or extract) data indicative of a merchant terminal 102 at which the payment must be initiated.

At step 210A, the network node 104 creates a payment profile comprising parameters defined in accordance with the information received at steps 202A to 208A. The network node 104 may store the created profile in the database 108. As will be discussed in more detail below, the network node 104 then pre-authorizes payments meeting the characteristics or parameters specified in the stored profile so that purchases matching the parameters of the payment profile are authorized in advance of the cardholder initiating the purchase, thereby reducing the time required to process the payment.

In an embodiment in which the registration method 200A is performed by a merchant terminal 101, the pre-authorization may only be associated with payments initiated at the merchant terminal 101 at which the registration is performed. Additionally or alternatively, the pre-authorization may be associated with one or more merchant terminals 102, 103, etc. other than the merchant terminal 101 at which the registration is performed.

Figure 2B:
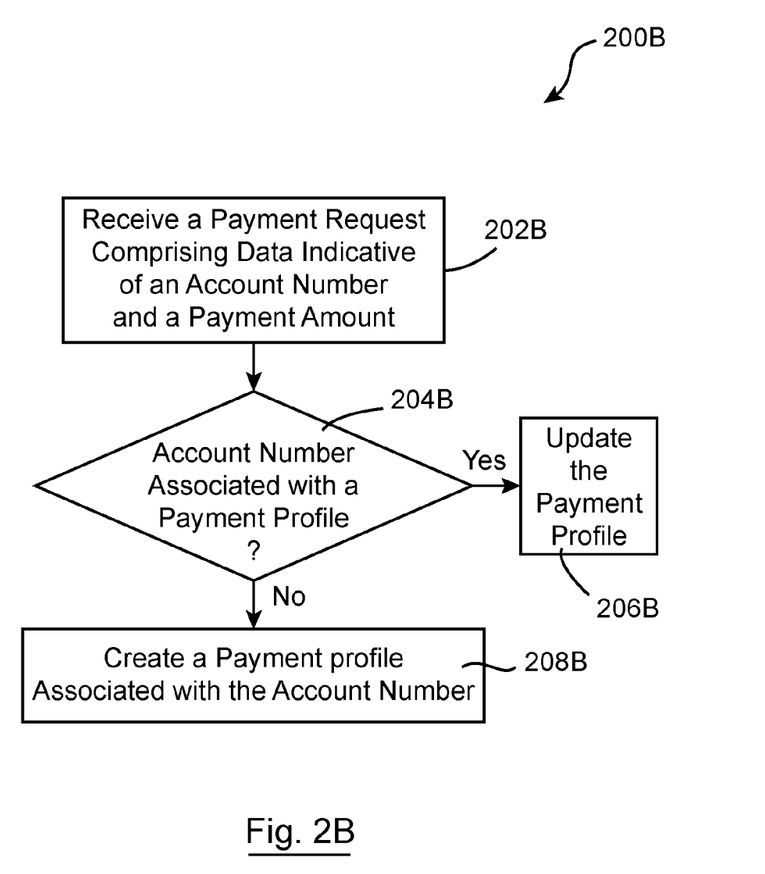
FIG. 2B is a flow diagram depicting an exemplary method of registering a cardholder to use the system according to an embodiment of the disclosure.

FIG. 2B depicts an exemplary method 200B of creating or updating a payment profile for use in accordance with the system 100.

At block 202B, the network node 104 receives a payment request comprising data indicative of a PAN; a payment amount; and a payment provider 110. In some embodiments, the PAN is itself indicative of the payment provider 110 and the network node 104 determines payment provider 110 based on the PAN. The payment request may also comprise data indicative of a payment recipient. Additionally or alternatively, the network node 104 may determine the payment recipient (or an account associated therewith) based on the terminal 101-103 from which the payment request originated.

Responsive to receiving the payment request, at block 204B the network node 104 determines whether the PAN is associated with a payment profile stored in the database 108. For example, the PAN indicated in the payment request may be associated with a payment profile stored during the registration process described in relation to FIG. 2A. Additionally or alternatively, the PAN may be associated with a payment profile stored in the database 108 by any other process or means.

Responsive to determining that the PAN indicated in the payment request is associated with a stored payment profile, at block 206B the network node 104 updates the stored profile in accordance with the payment details received at block 202B. For example, the network node 104 may update the payment profile by storing one or more of: the payment amount; an indication of the time at which the payment request is received; the payment recipient; and the merchant terminal 101-103 at which the payment request was initiated.

In an exemplary embodiment, the network node 104 updates the payment profile by monitoring payment requests made comprising the PAN and determining a payment profile comprising parameters indicative of one or more of a probable time or range of times at which a payment request will be made; a probable payment amount or range of payment amounts; a probable payment recipient; and a probable POS or group of POSs at which the payment request will be initiated. The parameters of the payment profile may be determined in any suitable manner. For example, the network node 104 may determine one or more of the parameters using any suitable statistical analysis of received payment requests that are associated with (specify or comprise) the PAN.

If, at block 204B, the network node 104 determines that the PAN is not associated with a payment profile, at block 208B the network node 104 creates a payment profile in association with the PAN. The payment profile comprises parameters defined in accordance with the information comprised within the payment request. The network node 104 may store the created profile in the database 108.

As will be discussed in detail in relation to FIG. 3, the network node 104 then pre-authorizes payments meeting the characteristics or parameters specified in the stored profile so that purchases matching the parameters of the payment profile are authorized in advance of the cardholder initiating the purchase, thereby reducing the time required to process the payment.

Figure 3:
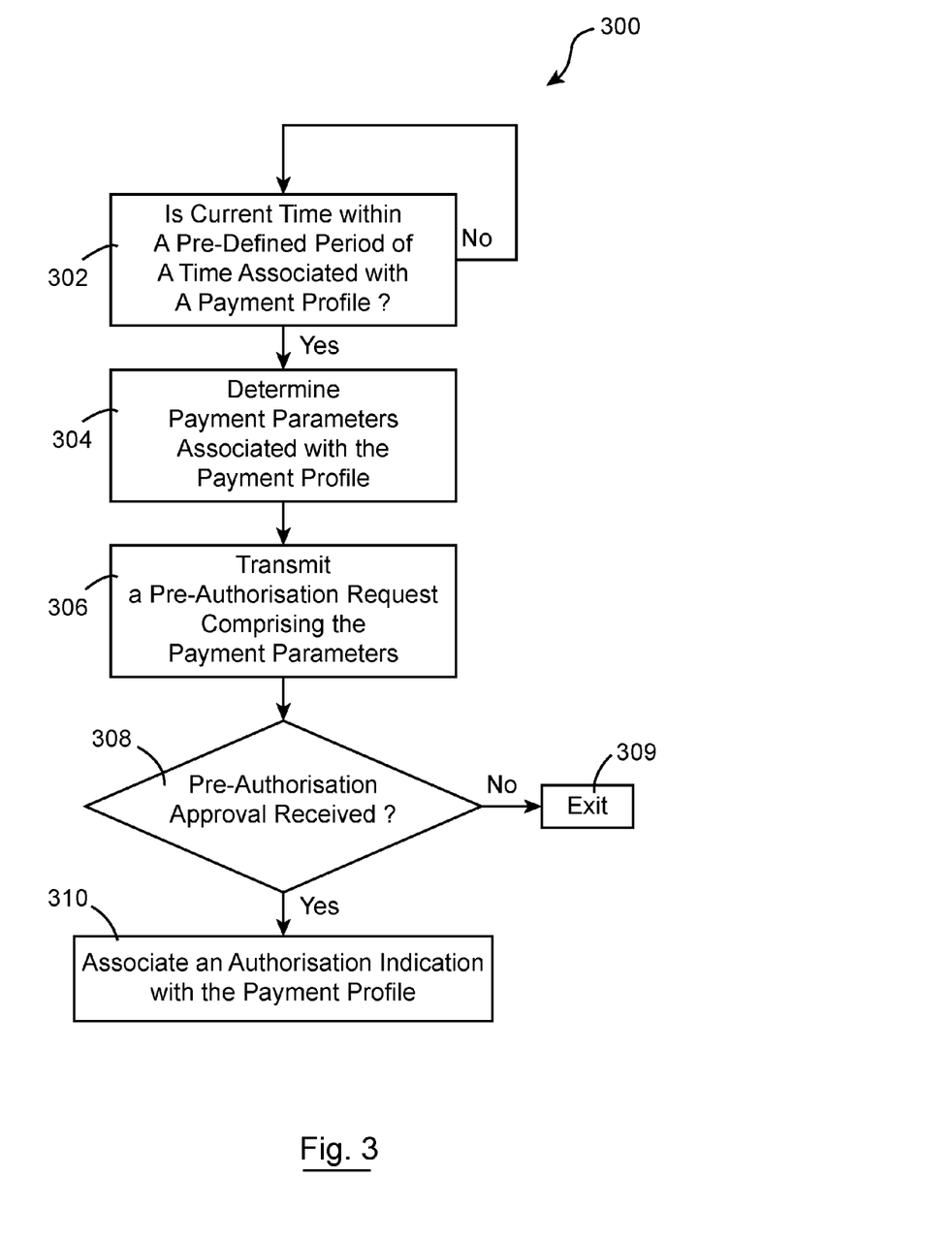
FIG. 3 is a flow diagram depicting a method according to an embodiment of the disclosure.

FIG. 3 depicts an exemplary method 300 of pre-authorizing a payment in accordance with an embodiment of the present disclosure.

At block 302, the network node 104 determines whether a current time is within a predefined period of a time associated with a payment profile. A time associated with a payment profile may comprise one or more time ranges. For example, a cardholder that regularly buys a newspaper on the way to or from work every day may have a payment profile associated with a time range from 5:30 pm to 6:00 pm in the evening and 8:30 am to 9:00 am in the morning. Additionally or alternatively, a time associated with a payment profile may comprise one or more days, dates, months or any other indication of a time or range of times at which a payment may be initiated. The predefined period may be any suitable time value. For example, the predefined value may be a number of minutes and/or seconds specified by an administrator of the pre-authorization system 100.

The steps at block 302 may be repeated at regular or irregular intervals until such time as the network node 104 determines that the current time is within a predefined period of a time associated with a payment profile.

At block 304, responsive to determining that the current time is within a predefined period of a time associated with a payment profile, the network node 104 determines the payment parameters associated with the payment profile. As described above in relation to FIGS. 2A and 2B, the payment parameters are indicative of any details required to effect a payment from a card (or account) including an indication of a payment provider 110; a PAN; as well as any one or more of: a payment amount; a payment recipient; and one or more POSs from which the payment may be initiated.

At block 306, the network node 104 transmits a pre-authorization request to the payment provider 110 associated with (or indicated by) the payment profile. The pre-authorization request comprises data indicative of the PAN associated with the payment profile; a payment amount associated with the payment profile together with any other parameters necessary to obtain pre-authorization approval.

The network node 104 may transmit the authorization request to an 'acquirer' network node. In this case, the acquirer node may then transmit individual authorization requests to the payment provider 110. Additionally or alternatively, the network node 104 may transmit the authorization request to the payment provider 110 directly and/or via one or more intermediary network nodes.

It will be appreciated that the network node 104 may transmit the pre-authorization request directly to the payment provider 110. Alternatively, the network node 104 may transmit the pre-authorization request to an 'acquirer' network node which may, in turn, transmit a pre-authorization request to the payment provider 110.

The pre-authorization request may additionally comprise data indicative of an identity of the payment recipient. In some embodiments, the payment provider 110 (the acquirer or other network node) identifies the recipient based on an identifier of the network node 104 from which the pre-authorization request is received.

The pre-authorization request may comprise an indication of a location of the network node 104 and/or a group of nodes of which the network node 104 is a member. Additionally or alternatively, the payment provider 110 (the acquirer or other network node) may determine a location of the network node 104 and/or a group of nodes of which the network node 104 is a member. This determination may be made in accordance with the network node 104 from which the pre-authorization request is received and/or in accordance with any other information comprised within the pre-authorization request.

Processing of the pre-authorization request by the payment provider 110 will be discussed in detail in relation to FIG. 4.

At block 308, the network node 104 determines whether a positive response or pre-authorization approval has been received from the payment provider 110. Responsive to determining that a refusal or rejection response has been received from the payment provider 110 (i.e. a response indicating that the payment has not been pre-authorized), the network node 104 exits the process at block 309.

Responsive to determining that a pre-authorization approval has been received from the payment provider 110, at block 310, the network node 104 associates an authorization indication with the payment profile. The authorization indication may be any suitable flag or parameter stored in association with, or comprised within, the payment profile. The authorization indication is indicative that pre-authorization approval has been received for the payment associated with (or indicated by) the payment profile.

In an exemplary embodiment the authorization indication is associated with a predefined period after the expiry of which the payment indicated by the payment profile is no longer pre-authorized. The predefined period may be defined by the payment provider 110. Additionally or alternatively, the predefined period may be defined by an administrator of the pre-authorization system 100; the cardholder during a registration process, e.g. the method 200A.

In an exemplary embodiment in which the authorization indication is associated with a predefined period, the network node 104 determines at regular or irregular intervals whether the predefined period has expired. Responsive to determining that the period has expired, the network node 104 may update the payment profile to indicate that it is no longer associated with an authorization indication.

In an exemplary embodiment, responsive to determining that the predefined period associated with the authorization indication has expired, the network node 104 repeats the steps performed at blocks 302 to 310. The network node 104 may continue to repeat these steps until a limiting condition is determined. For example, the limiting condition may comprise one or more of: receiving a payment request comprising data indicative of the PAN; determining that the steps at blocks 302 to 310 have been performed a predetermined number of times; and determining that a current time is not within a predefined period of the payment time associated with the payment profile.

Figure 4:
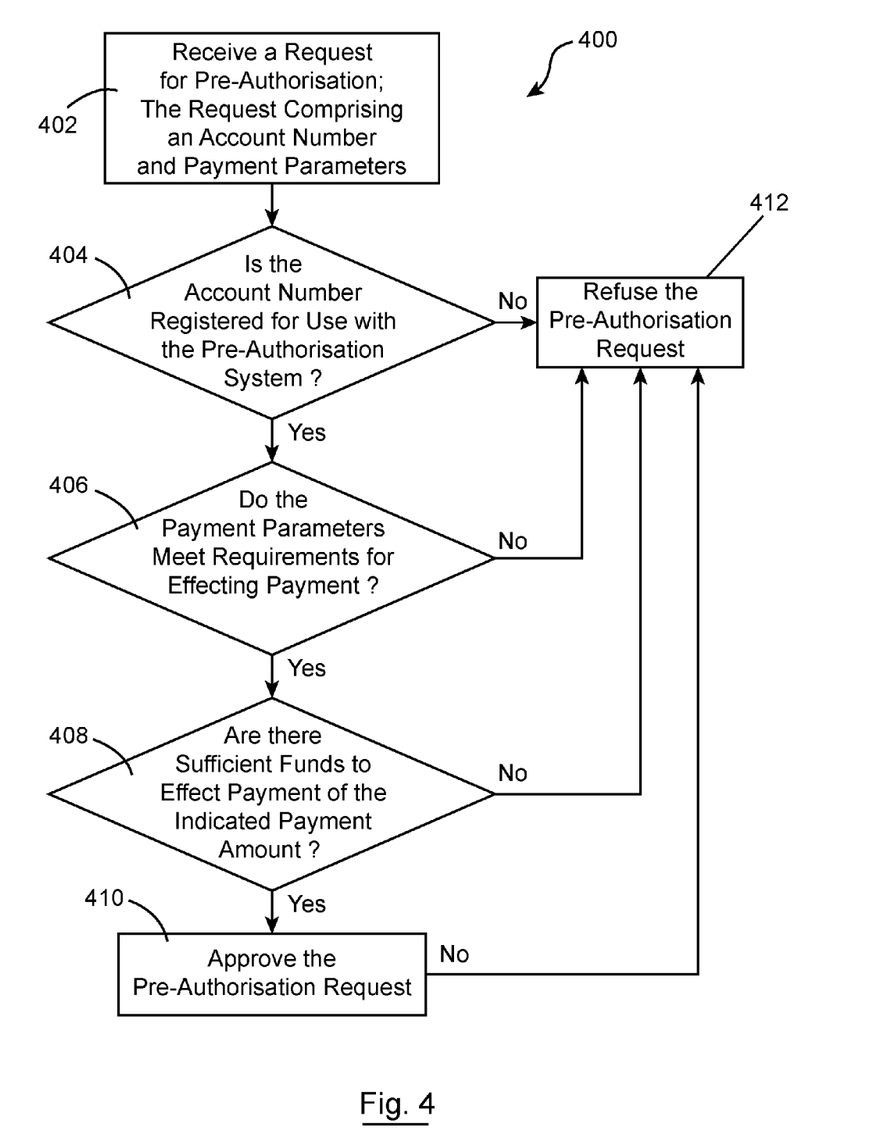
FIG. 4 is a flow diagram depicting a method of processing a pre-authorization request according to an embodiment of the disclosure.

FIG. 4 depicts an exemplary method 400 of processing a pre-authorization request at a payment provider 110 or a network node operated by, in association with, or on behalf of a payment provider 110.

At block 402 the payment provider 110 receives a pre-authorization request from a network node 104. As discussed in relation to block 306, the pre-authorization request comprises information indicative of a PAN, a payment amount, a payment recipient and any other information required to effect payment from an account associated with the PAN to an account associated with the payment recipient.

At block 404 the payment provider 110 processes the pre-authorization request to determine whether the payment detailed in the pre-authorization request can be authorized. The payment provider 110 may process the pre-authorization request in any suitable manner.

In an exemplary embodiment, the payment provider 110 processes the pre-authorization request by determining whether the PAN provided in the request has been registered for use in the pre-authorization system 100. If the payment provider 110 determines that the PAN has not been registered for use in the pre-authorization system 100, at block 406, the payment provider 110 refuses (declines, rejects, etc.) the pre-authorization request (at block 412). It will be appreciated that refusal of the pre-authorization request may comprise the payment provider 110 transmitting a response to the network node 104 indicating that the pre-authorization request has been refused. Alternatively, the payment provider 110 may not transmit any response to the pre-authorization request, in which case the network node 104 recognises the absence of a response to be indicative of a refusal of the pre-authorization request.

In an exemplary embodiment, subsequent to determining that the PAN is registered for use in the pre-authorization system 100, at block 406 the payment provider 110 determines whether the details provided in the pre-authorization request meet the necessary security requirements to effect payment from the account associated with the PAN. For example, the payment provider 110 may determine whether one or more of: the PAN; the expiry date; the CCV number; and any other relevant details correctly meet the requirements for effecting payment.

Responsive to determining that the details comprised within the pre-authorization request do not meet the security requirements for effecting payment from the account associated with the PAN, the payment provider 110 refuses the pre-authorization as discussed above in relation to block 406.

Responsive to determining that the details provided meet the relevant security requirements, at block 408 the payment provider 110 determines whether a payment of the payment amount specified in the pre-authorization request can be made from the account. For example, the payment provider 110 may determine whether there are sufficient funds in the account to effect payment of this amount; whether a payment limit associated with the account has been exceeded; or whether any other conditions or characteristics of the account mean that a payment of the specified amount cannot be effected.

If the payment provider 110 determines that a payment for the indicated payment amount cannot be effected from the account associated with the PAN, the payment provider 110 refuses the pre-authorization request in the manner described above in relation to block 406.

If the payment provider 110 determines that a payment for the indicated payment amount can be effected, the payment provider 110 may place a 'hold' on the account for the indicated payment amount so that at least the indicated payment amount remains available in the account. For example, if the payment provider 110 receives a preauthorization request comprising a payment amount of €50 in respect of an account with a payment limit of €1000 (which may be set by a credit limit; an amount of available funds; a daily transaction limit; or any other suitable criteria), the payment provider may place a 'hold' on (reserve, ring-fence, etc.) €50 so that the subsequent payment limit for the account is €950.

It will be appreciated that the order in which blocks 404 to 410 are performed may vary. Additionally or alternatively, one or more of the blocks may be omitted.

At block 410 the payment provider 110 approves the pre-authorization request. The payment provider 110 may then transmit an indication that the pre-authorization request has been approved to the network node 104. The indication of approval may be transmitted directly from the payment provider 110 to the network node 104. Additionally or alternatively, the indication of approval may be transmitted to the network node 104 via one or more other network nodes.

In an exemplary embodiment in which the pre-authorization request comprises an indication of a location of the network node 104 and/or a group of which the network node is a member, at block 410 the payment provider 110 transmits the indication of pre-authorization approval to a plurality of network nodes in accordance with the location and/or group membership of the network node 104.

For example, if the network node 104 is one POS terminal in a department store the pre-authorization approval may be transmitted to all the POS terminals in the department store so that the cardholder can easily and efficiently effect a payment at any one of the terminals. Additionally or alternatively, the network node 104 may be a POS terminal operated by a chain of stores wherein the pre-authorization approval is transmitted to all the POS terminals operated by the chain or all the terminals of the chain within a predefined radius of the network node 104. In this manner, a cardholder wishing, for example, to buy a cup of coffee at any one of a plurality of coffee shops run by a coffee chain can easily and efficiently effect the transaction regardless of which shop he selects.

Figure 5:
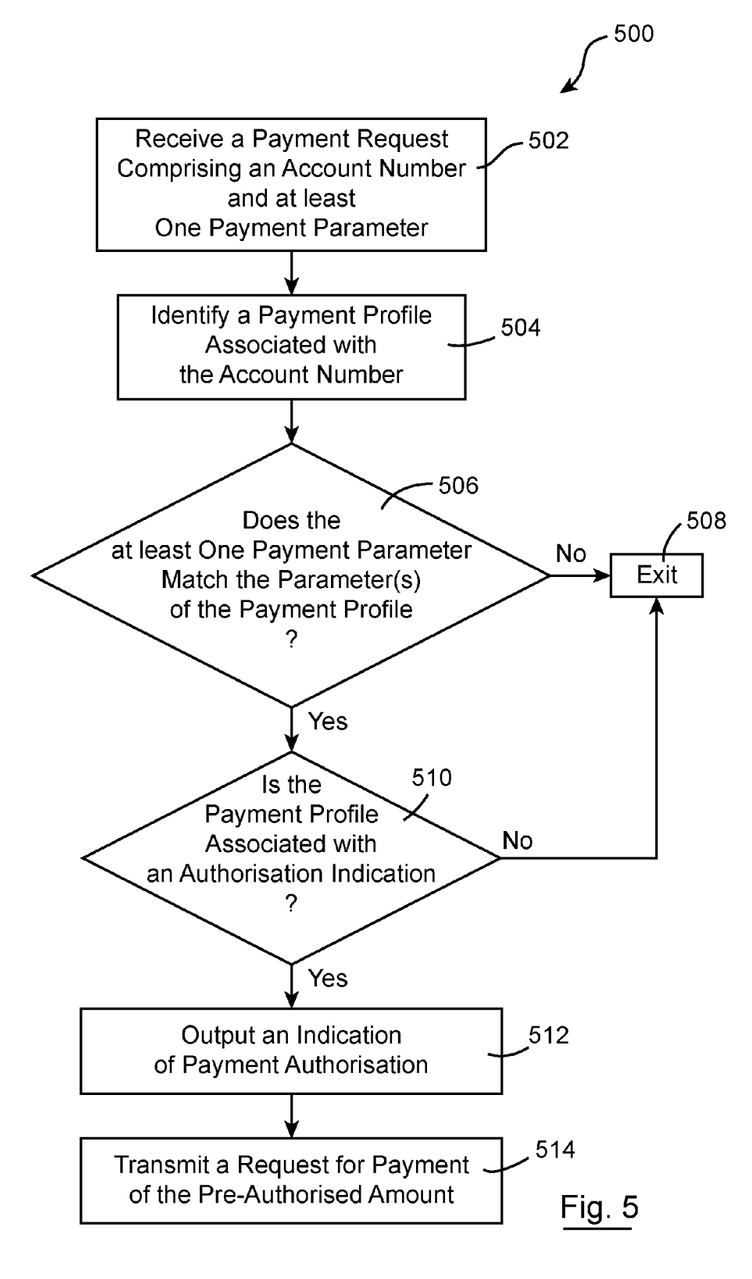
FIG. 5 is a flow diagram depicting a method of processing a payment request according to an embodiment of the disclosure.

FIG. 5 is a flow diagram depicting a method 500 of processing a payment request according to an embodiment of the present disclosure.

At block 502, the network node 104 receives a payment request comprising data indicative of a PAN and at least one further payment parameter. The at least one further payment parameter may, for example, comprise one or more of: a payment amount; a payment provider 110; security details such as an expiry date, or CCV; and/or any other suitable payment parameters required to effect payment from the account associated with the PAN. Additionally or alternatively, the network node 104 may determine one or more payment parameters such as the payment provider 110; the payment recipient, etc. based on information comprised within the payment request and/or the merchant terminal 101-103 from which the payment request was received.

At block 504, the network node 104 identifies a payment profile associated with the PAN indicated in the payment request. As discussed in relation to FIGS. 2A and 2B the payment profile may, for example, be stored in the database 108.

At block 506, the network node 104 determines whether the payment request matches the identified payment profile. The network node 104 determines that the payment request matches the identified payment profile if one or more of the parameters of the payment request are determined to match parameters of the payment profile. In an exemplary embodiment, the network node 104 may determine that a payment request matches a payment profile if a payment amount indicated in the payment request is within a predefined range of a payment amount associated with the payment profile. Additionally or alternatively, the network node 104 may determine that the payment request matches the payment profile if a time at which the payment request is received is within a predefined range of a time associated with the payment profile.

If the network node 104 determines that the payment request does not match the payment profile, at block 508, the payment request is processed as a 'regular' payment request (i.e. the payment request is processed in the same manner as a payment request comprising a PAN not associated with a payment profile).

If the payment request is determined to match the identified payment profile, at block 510 the network node 104 determines whether the payment profile is associated with an authorization indication.

If the network node 104 determines that the payment profile is not associated with an authorization indication processing continues at block 508 at which the payment request is processed as a 'regular' payment request.

Alternatively, if the payment profile is determined to be associated with an authorization indication, at block 512 the network node 104 outputs an indication of payment authorization. The indication of payment authorization may be any suitable indication that the payment has been authorized and that no further details are required to effect the payment. For example, in an embodiment in which the network node 104 is a physical POS terminal, the indication of payment authorization may be one or more of the terminal outputting a graphical display indicating completion of the payment; and the terminal printing a receipt. Similarly, in an embodiment in which the network node 104 is a virtual POS, the indication of payment authorization may be one or more of re-direction of a web browser to a webpage indicating that the payment has been completed; transmission of an email confirming completion of payment; and/or any other suitable indication that the cardholder is not required to complete any further steps for payment to be effected.

At block 514, the network node 104 transmits a request for payment of the pre-authorized amount to the payment provider 110. As with the pre-authorization request, the payment request may be transmitted directly to the payment provider 110. Additionally or alternatively, the payment request may be transmitted to the payment provider 110 via an acquirer network node or one or more other network nodes. The request for payment of the pre-authorized amount comprises data indicative that pre-authorization approval was previously received. For example, the request may comprise an identifier of the received approval indication to enable the payment provider 110 to identify one or more of the pre-authorized payment amounts and the pre-authorized payment recipient. Based on this information, the payment provider 110 can effect payment of the previously authorized amount to the previously authorized recipient.

In some embodiments, instead of placing a 'hold' on funds in the account at block 410 of the method 400, the payment provider 110 may instead processes the pre-authorization request in the same manner as a 'regular' authorization request for the associated PAN. In this case, if the payment is authorized, the pre-authorization response transmitted to the network node 104 may be the same as a 'regular' payment authorization notification and the payment amount specified in the pre-authorization request may be transferred from the account associated with the PAN to the account associated with the payment recipient. In this case, it may not be necessary for the network node 104 to transmit a request for payment of the pre-authorized amount at block 512.

Instead, if the network node 104 does not receive a payment request comprising the PAN and matching the parameters of the associated payment profile, the network node 104 transmits a request for reversal of the effected payment. For example, a payment profile may be associated with a payment of €50 from an account associated with a PAN to a petrol station every Saturday morning between 10 am and 11 am. In this case, a POS operating on behalf of the petrol station may request pre-authorization of the payment at (or close to) 10 am. in response to the pre-authorization request, the payment provider 110 effects a payment of €50 from the account associated with the PAN to an account associated with the petrol station.

In this example, if the cardholder effects a payment of (or within a predefined range of) €50 to the petrol station between 10 am and 11 am (or within a predefined period of these times) no further action is required. However, if the cardholder does not request payment of the specified amount (or requests payment of a lesser amount), on expiry of the time associated with the payment profile, a POS operating on behalf of the petrol station transmits a request for reversal of some or all of the payment to the payment provider 110 and/or to a payment provider associated with the petrol station's account. Responsive to receiving the request for reversal of the previous payment, the payment provider 110 and/or the payment provider associated with the petrol station's account cause the €50 payment to be reversed so that the €50 is returned to the cardholder's account (i.e. the account associated with the PAN).

Figure 6:
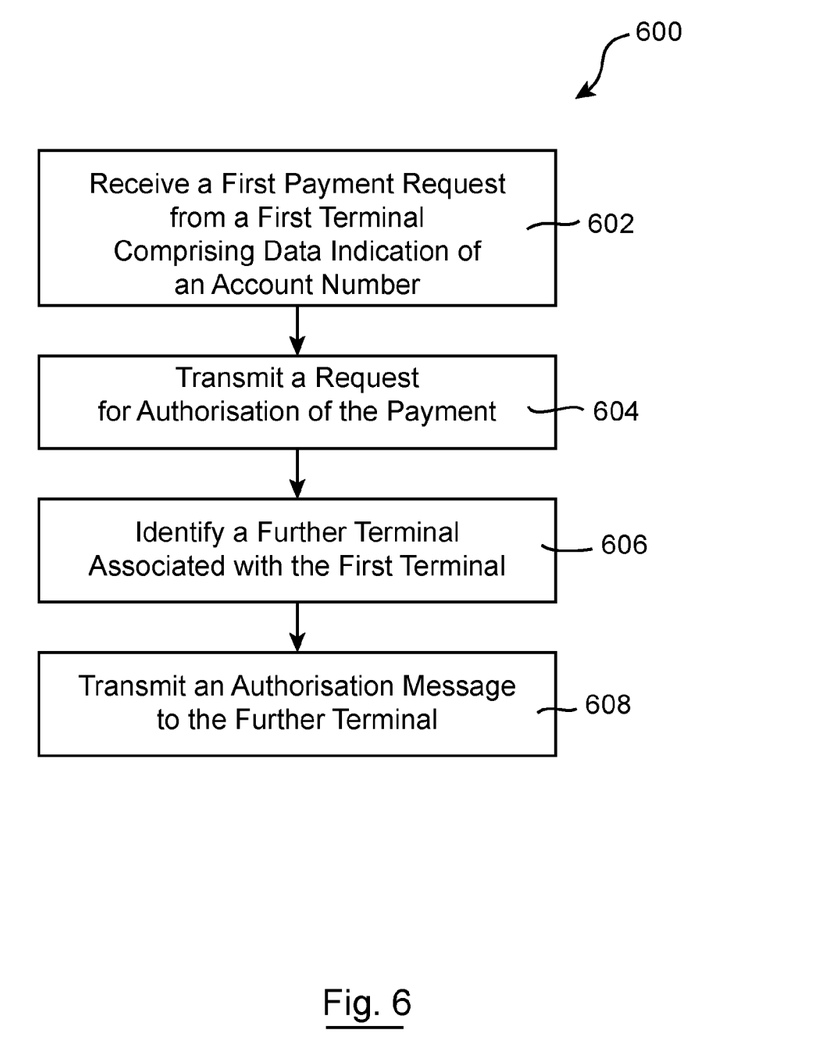
FIG. 6 is a flow diagram depicting a method of processing a payment request according to a further embodiment of the disclosure.

FIG. 6 is a flow diagram depicting a method 600 of processing a payment request according to an embodiment of the disclosure.

At block 602, a network node 104 receives a payment request from a first terminal 101, the request comprising data indicative of a PAN; a payment amount; a payment recipient; and a payment provider 110. The network node 104 may determine the payment recipient in accordance with the terminal 101-103 from which the request was received. Additionally or alternatively, the network node 104 may determine the payment provider 110 in accordance with the PAN.

As with previous embodiments, the terminal 101 may be comprised within the network node 104. Additionally or alternatively, the terminal 101 may communicate with the network node 104 over the network 106. For example, the network node 104 may be an acquirer network node or any other node operating on the network 106.

At block 604 the network node 104 transmits an authorization request to the payment provider 110. The network node 104 may transmit the authorization request to the payment provider 110 in any suitable manner. For example, the network node 104 may transmit the authorization request to a network node operated by or on behalf of an acquirer. In this case, the acquirer node may then transmit an authorization request to the payment provider 110. Additionally or alternatively, the network node 104 may transmit the authorization request to the payment provider 110.

Responsive to receiving the authorization request, the payment provider 110 (or a node operating in association with or on behalf of the payment provider 110) determines whether the requested payment can be authorized based on the details provided in the payment request. For example, the payment provider 110 may determine whether one or more of the PAN, the CCV number, the expiry date and any other information provided are correct (i.e. match corresponding parameter values stored by or in association with the payment provider 110).

If the payment provider 110 determines that the details provided in the payment request are correct, the payment provider 110 transmits an authorization response to the network node 104 and effects payment from the account associated with the PAN indicated in the payment request to an account associated with the recipient indicated in the payment request.

On the other hand, if the payment provider 110 determines that the details provided in the payment request are incorrect (i.e. do not match corresponding parameter values stored by or in associated with the payment provider 110), the payment provider 110 transmits a refusal or negative response to the network node 104. In this case, no payment is effected.

At block 606, the network node 104 identifies at least one further terminal 102, 103 determined to be associated with the first terminal 101 in accordance with a predetermined rule.

The predetermined rule may be any suitable rule for defining a relationship between a plurality of terminals. For example, the predetermined rule may be a geographical radius wherein the at least one further terminal 102, 103 are located within a predefined radius of the first terminal 101. Additionally or alternatively, the at least one further terminal 102, 103 may be operated by and/or located in stores in the same chain (or group) as the store in which the terminal 101 is operated and/or located. In an exemplary embodiment, the terminal 101 comprises a POS terminal located in a shop in a shopping centre and the at least one further terminal 102, 103 comprise POS terminals located in other shops in the shopping centre.

At block 608, the network node 104 transmits an authorization message to the at least one further terminal 102, 103. Prior to receiving the authorization message, the at least one further terminal 102, 103 and/or the first terminal 101 process any received payment requests in accordance with a first set of rules. For example, the first terminal 101 and/or the at least one further terminal 102,103 may process requests for payments of amounts up to a first payment limit. Additionally or alternatively, the first terminal and/or the at least one further terminal 102,103 may process RFID or 'contactless' payments up to a first contactless limit.

The authorization message may comprise any suitable indication that subsequent payment requests received at any of the first terminal 101 and the identified further terminals 102,103 and comprising an indication of the PAN indicated in the first request (the 'authorized PAN') may be processed in accordance with a second set of rules different to the first set of rules. For example, in accordance with the second set of rules the terminal 101-103 may permit process requests indicating the PAN for payment of amounts up to a second payment limit greater than the first payment limit. Similarly, in accordance with the second set of rules, terminals in the identified group may process RFID or 'contactless' payments for payments up to a second contactless limit greater than the first contactless limit.

The authorization message may further comprise an indication of a pre-defined duration for which the terminals in the identified group are permitted to process payment requests indicating the authorized PAN in accordance with the second set of rules. For example, the authorization message may indicate that any payment requests comprising the authorized PAN and received within an hour of receiving the first request and/or the registration details may be processed in accordance with the second set of rules. In an exemplary embodiment, the pre-defined duration may be specified by a user during a registration process (e.g. as discussed in relation to FIG. 2A). After expiration of the pre-defined duration, the terminals 101-103 once again process any subsequent payment requests comprising the authorized PAN in accordance with the first set of rules.

The steps performed at 606 and 608 may be performed in response to determining that the PAN has been registered for use with the system 100. For example, a cardholder may register the PAN for use with the system 100 as described in relation to FIG. 2A. Additionally or alternatively the cardholder may elect to 'opt-in' or use the system by including an indication to this effect when making the first payment request. Responsive to determining that the PAN has been registered for use in the group system and/or that the first payment request comprises an indication that the PAN is to be used in the group system, the network node 104 performs blocks 606 and 608 in the described manner.

Additionally or alternatively, prior registration of the PAN or a user selection to 'opt-in' may not be required. Instead, the steps performed at block 606 and 608 may simply be performed in response to the network node 104 receiving an authorization response from the payment provider 110. In this manner, once an initial payment request made at a first terminal is authorized, subsequent payment requests made within a predefined period at an associated terminal can be processed in a different manner than they would be if no previous authorization had been received. For example, if a cardholder provides the necessary details for a purchase of cinema tickets using a debit/credit card to be authorized, the maximum amount that the cardholder can spend at the cinema's snacks counter using contactless (or RFID) payment may be increased above a usual limit.

The disclosure is not limited to the embodiment(s) described herein but can be amended or modified without departing from the scope of the present disclosure. Additionally, it will be appreciated that in embodiments of the disclosure some of the above-described steps may be omitted and/or performed in an order other than that described.

In addition, it should be appreciated that the functions and/or steps described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of processing a payment request, the method comprising:
   (i) determining, by a processor of a network node, when a current time is within a predefined period of a payment time associated with a payment profile;
   (ii) determining, by the processor, an account number, a payment amount and a payment provider associated with the payment profile;
   (iii) transmitting to the payment provider, by the processor, a request for pre-authorization of payment of the payment amount from an account associated with the determined account number after the current time is determined to be within the predefined period; and
   (iv) responsive to receiving a pre-authorization from the payment provider, associating, by the processor, an authorization indication with the payment profile.

2. The method of claim 1, further comprising:
   receiving, by the processor, a payment request, the request comprising data indicative of an account number and at least one payment parameter;
   identifying, by the processor, a payment profile associated with the account number;
   determining, by the processor, in accordance with the at least one payment parameter, that the payment request matches the identified payment profile;
   determining, by the processor, that the payment profile is associated with the authorization indication; and
   outputting, by the processor, an authorization of the payment request, prior to and/or without a response to the payment request from the payment provider.

3. The method of claim 2, wherein the at least one payment parameter comprises data indicative of one or more of:
   a recipient;
   a payment amount; and
   a time at which the payment request is received.

4. The method of claim 3, further comprising, subsequent to outputting the authorization of the payment request, transmitting to the payment provider, by the processor, a request for payment of the payment amount to the recipient from an account associated with the account number.

5. The method of claim 4, wherein the received authorization indication has an associated time period; and
   further comprising, responsive to determining that an elapsed time since receiving the pre-authorization is greater than the time period associated with the authorization indication, repeating steps (iii) and (iv) at predefined intervals until a limiting condition is detected.

6. The method of claim 5, further comprising, responsive to determining that an elapsed time since receiving the pre-authorization is greater than the time period associated with the authorization indication, repeating steps (iii) and (iv) at predefined intervals until a limiting condition is detected.

7. The method of claim 6, wherein the limiting condition comprises one or more of the following:
   receiving a payment request comprising data indicative of the account number;
   determining that the steps (iii) and (iv) have been performed a predetermined number of times; and
   determining that a current time is not within the predefined period of the payment time.

8. The method of claim 1, further comprising, prior to performance of steps (i) to (iv):
   receiving, by the processor, an initial payment request comprising data indicative of an account number, a payment provider and a payment amount; and
   responsive to determining that the account number is not associated with a payment profile:
     creating, by the processor, a payment profile associated with the account number; and
     storing, by the processor, the created payment profile in association with an indication of the payment provider, an indication of the payment amount, and an indication of a time of receiving the initial payment request.

9. The method of claim 8, further comprising, responsive to determining that the account number is associated with a payment profile, updating the payment profile, by the processor, in accordance with the payment provider, the payment amount and a time of receiving the initial payment request.

10. A computer-implemented method of processing a request at a network node operated in association with a payment provider, the method comprising:
- receiving, by a processor, a first request from a terminal, the first request comprising data indicative of an account number;
- determining, by the processor, a location associated with the terminal;
- identifying, by the processor, at least one further terminal associated with the determined location, wherein the at least one further terminal is configured to process payment requests in accordance with a first set of authorization rules; and
- transmitting, by the processor, an authorization message to the at least one further terminal, wherein the authorization message is indicative that the at least one further terminal should process payment requests associated with the account number in accordance with a second set of authorization rules.

11. The method of claim 10, wherein the first set of authorization rules comprises data indicative of a first maximum payment amount that can be authorized using radio frequency identification (RFID) and the second set of authorization rules comprises data indicative of a second maximum payment amount that can be authorized using RFID, the second maximum payment amount being greater than the first maximum payment amount.

12. The method of claim 10, wherein the first set of authorization rules comprises data indicative that payment requests associated with the account number and requesting payment of an amount less than a maximum payment amount can be authorized by the at least one further terminal.

13. The method of claim 10, wherein after expiry of a predefined period, the at least one further terminal processes payment requests associated with the account number in accordance with the first set of authorization rules.

14. The method of claim 10, wherein the first request comprises a payment request.

15. A network node comprising a processor configured to:
- receive a first request from a first terminal, the first request comprising data indicative of an account number;
- determine a location associated with the first terminal;
- identify at least one further terminal associated with the determined location, wherein the at least one further terminal is configured to process payment requests in accordance with a first set of authorization rules; and
- transmit an authorization message to the at least one further terminal, wherein the authorization message is indicative that the at least one further terminal should process payment requests associated with the account number in accordance with a second set of authorization rules.

16. The network node of claim 15, wherein the first set of authorization rules comprises data indicative of a first maximum payment amount that can be authorized using radio frequency identification (RFID) and the second set of authorization rules comprises data indicative of a second maximum payment amount that can be authorized using RFID, the second maximum payment amount being greater than the first maximum payment amount.

17. The network node of claim 15, wherein the first set of authorization rules comprises data indicative that payment requests associated with the account number and requesting payment of an amount less than a maximum payment amount can be authorized by the at least one further terminal.

18. The network node of claim 15, wherein after expiry of a predefined period, the at least one further terminal processes payment requests associated with the account number in accordance with the first set of authorization rules.

19. The network node of claim 15, wherein the first request comprises a payment request.

20. A system comprising:
- a first terminal;
- at least one further terminal configured to process payment requests in accordance with a first set of authorization rules; and
- a network node comprising a processor configured to:
  - receive a first request from the first terminal, the first request comprising data indicative of an account number;
  - determine a location associated with the first terminal;
  - identify the at least one further terminal based on the determined location; and
  - transmit an authorization message to the at least one further terminal, wherein the authorization message includes an indication that the at least one further terminal is to process payment requests associated with the account number in accordance with a second set of authorization rules different than the first set of authorization rules.

* * * * *